United States Patent
Yang et al.

(10) Patent No.: US 10,498,683 B2
(45) Date of Patent: Dec. 3, 2019

(54) COMPRESSED MESSAGE SETS FOR STORAGE EFFICIENCY

(71) Applicant: AT&T Intellectual Property I, L.P., Atlanta, GA (US)

(72) Inventors: Chen-Yui Yang, Marlboro, NJ (US); Joseph Battista, Colts Neck, NJ (US); Hung-Kuei Ku, Morganville, NJ (US); Wen-Jui Li, Bridgewater, NJ (US); George Sultana, Wayside, NJ (US); Daniel Zuckerman, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 697 days.

(21) Appl. No.: 15/215,029

(22) Filed: Jul. 20, 2016

(65) Prior Publication Data
US 2018/0024780 A1    Jan. 25, 2018

(51) Int. Cl.
*G06F 16/00* (2019.01)
*H04L 12/58* (2006.01)

(52) U.S. Cl.
CPC .............. *H04L 51/22* (2013.01); *G06F 16/00* (2019.01); *H04L 51/38* (2013.01)

(58) Field of Classification Search
CPC ................................. G06F 16/00; H04L 51/22
See application file for complete search history.

(56) References Cited

U.S. PATENT DOCUMENTS

| | | | |
|---|---|---|---|
| 6,680,955 B1 * | 1/2004 | Le | H04L 29/06 370/477 |
| 7,143,191 B2 | 11/2006 | Chuah et al. | |
| 7,529,845 B2 | 5/2009 | Liu | |
| 7,548,928 B1 * | 6/2009 | Dean | H03M 7/3084 |
| 7,602,778 B2 | 10/2009 | Guichard et al. | |
| 7,746,250 B2 | 6/2010 | Nanda et al. | |
| 7,746,880 B2 | 6/2010 | Wartenberg | |
| 8,254,389 B2 | 8/2012 | Guo et al. | |
| 8,311,060 B2 | 11/2012 | Chen et al. | |
| 8,467,415 B2 | 6/2013 | Antonelli et al. | |
| 8,855,135 B2 | 10/2014 | Liang et al. | |
| 9,246,863 B2 | 1/2016 | Eom et al. | |
| 2011/0064093 A1 | 3/2011 | Mattson et al. | |
| 2016/0142937 A1 | 5/2016 | Balasubramanian et al. | |

* cited by examiner

*Primary Examiner* — Van H Oberly (57) ABSTRACT

A processor may determine a message type of a message of a message set and extract strings from the message based upon the message type, each string associated with a field type within the message type. The processor may write one of the strings to a string table, when not already stored in the string table, and add an offset position of the string in the string table to a column list for the field type associated with the string, when not already stored in the column list. There may be different column lists for different field types. The processor may populate an entry of a data table corresponding to the message and to the field type associated with the string with an index of the offset position within the column list, and store a compressed version of the message set including the string table, column lists, and data table.

20 Claims, 5 Drawing Sheets

FIG. 1

```
struct parse_element asp_sfw_delete_flow1[] = {         ← 250
    {"prival",50,'<','>'},
    {"timestamp",120,' ',' '},
    {"service_set",50,'{','}'},
    {"service",50,'[',']'},
    {"tag",5,' ',':'},
    {"keyword",5,' ',' ',0,0,0,0,"proto"},
    {"proto_num",500,' ',' '},
    {"proto",500,'(',')'},
    {"keyword",5,' ',' ',0,0,0,0,"application:"},
    {"application",500,' ',';'},
    {"interface",1000,' ',':'},
    {"source_ip",300000,':',':'},
    {"source_port",66000,':',' '},
    {"keyword",5,' ',' ',0,0,0,0,"->"},
    {"dest_ip",300000,' ',':'},
    {"dest_port",66000,':',' '},
    {"event_type",10000,' ',':'},
    {"nat_info",1000,' ',' ', PARSE_RELATIVE_BEFORE, ':'},
    {"nat_ip",300000,' ',':'},
    {"nat_port",66000,':', 0}};
```

<1> 2013-10-07 05:40:03 {SFW6_SP-11-1-7}[IDS] ASP_SFW_DELETE_FLOW 111.11.111.111:1234 -> 22.222.222.222:44183 TCP                    ← 210

<1> 2013-10-07 05:40:09 {SFW6_SP-11-1-7}[FWNAT] ASP_SFW_DELETE_FLOW 33.33.33.33:65368 -> 44.444.44.44:1234 TCP                    ← 220

1 | 2013-10-07 05:40:03 | SFW6_SP-11-1-7 | ASP_SFW_DELETE_FLOW | 111.11.111.111 | 1234 | 22.222.222.222 | 44183 | TCP                    ← 230

1 | 2013-10-07 05:40:09 | SFW6_SP-11-1-7 | ASP_SFW_DELETE_FLOW | 33.33.33.33 | 65368 | 44.444.44.44 | 1234 | TCP                    ← 240

{ABCD} 9999         ABCD | 9999         ← 270    280

COMPRESSED MESSAGE SETS FOR STORAGE EFFICIENCY

The present disclosure relates generally to the collection and storage of control and signaling messages, e.g., within a wireless network such as a cellular network, and more particular to devices, computer-readable media, and methods for storing sets of messages in a compressed format that may occupy less storage volume than in a raw data format.

BACKGROUND

Telecommunications networks generate large amounts of control plane signaling messages and session management messages. Only a small fraction of these messages may be of importance to the network operator. However, the storage of these messages may still be desired and/or required for various purposes. For instance, messages that relate to blocked calls, failed calls, and network anomalies may be of relatively greater significance. Nevertheless, a large number of messages that relate to normal calls and normal operations may serve as a baseline that is indicative of when anomalies may occur. However, as the size of telecommunications networks grows, and as more and more data and communications traverse telecommunications networks, the volume of control plane signaling messages and session management messages also grows. Thus, the storage of these messages remains a challenge in and of itself.

SUMMARY

In one example, the present disclosure discloses a method, computer-readable medium, and device for storing a compressed version of a message set. For example, a processor determines a message type of a message of a plurality of messages of a message set, extracts a plurality of strings from the message based upon the message type, each of the plurality of strings associated with a different field type of a plurality of field types within the message type, writes a string from the plurality of strings to a string table, when the string is not already stored in the string table, adds an offset position of the string in the string table to a column list for one field type of the plurality of field types associated with the string, when the offset position is not already stored in the column list, wherein the column list is one of a plurality of column lists for the plurality of field types, populates an entry of a data table corresponding to the message and to the one field type with an index of the offset position within the column list, and stores a compressed version of the message set comprising the string table, the plurality of column lists, and the data table.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media, and devices for storing a compressed version of a message set. For example, a message set may comprise a plurality of messages. In one example, the messages may relate to control plane signaling and/or session management messages in a telecommunications network. The message types of messages in the message set may be determined, and the messages may be parsed according to the message types to extract strings of various fields within the respective messages. The strings may be added to a string table, where each unique string may occur in the string table only once. In one example, a column table comprising a plurality of column lists is generated. In one example, each column list corresponds to a field type within a message type related to at least one message that is encountered within the message set. Messages in the message set may be examined, and when a string is found within a particular field of a message, an offset position of the string within the string table is added to the column list associated with a field type of the field, if the offset position of the string has not already been added to the column list. For example, the offset position may already be present in the column list as a result of a previous encounter with the string in the same field within an earlier processed message of the same message type. In one example, column lists are maintained as a list of indexes which are populated with offset position values of various strings in the string table. As used herein, the term "index" refers to an indication of the position of an item within the list, e.g., index zero, index 1, index 2, etc.

In one example, a data table for the message set is also generated. In one example, rows in the data table represent respective messages in the message set, and columns of the data table correspond to field types within message types related to at least one message that is encountered within the message set. The columns in the data table are also related to corresponding column lists that are associated with the respective field types. For strings in each message, an index in a column list associated with the field type of the field in the message in which the string occurs is added to the data table at the position where the row of the message and the column of the field type in the data table intersect or overlap. In particular, the index that is added to the data table at this location is the index where the offset position associated with the string was added to the column list. Thus, the entry in the data table can be linked to an index within the one of the plurality of column lists associated with the field type. The offset position stored in the column list at that index is linked to the string within the string table, which can be found at the offset position. The string table, the data table and the column lists (or column table) collectively represent the entire message set, and may be stored as a compressed version of the message set. Notably, the compressed version of the message set may occupy less storage volume than the message set in a raw data format. However, the original message set may still be reconstructed from the compressed version of the message set. These and other aspects of the present disclosure are discussed in greater detail below in connection with the examples of FIGS. 1-5.

Figure 1:
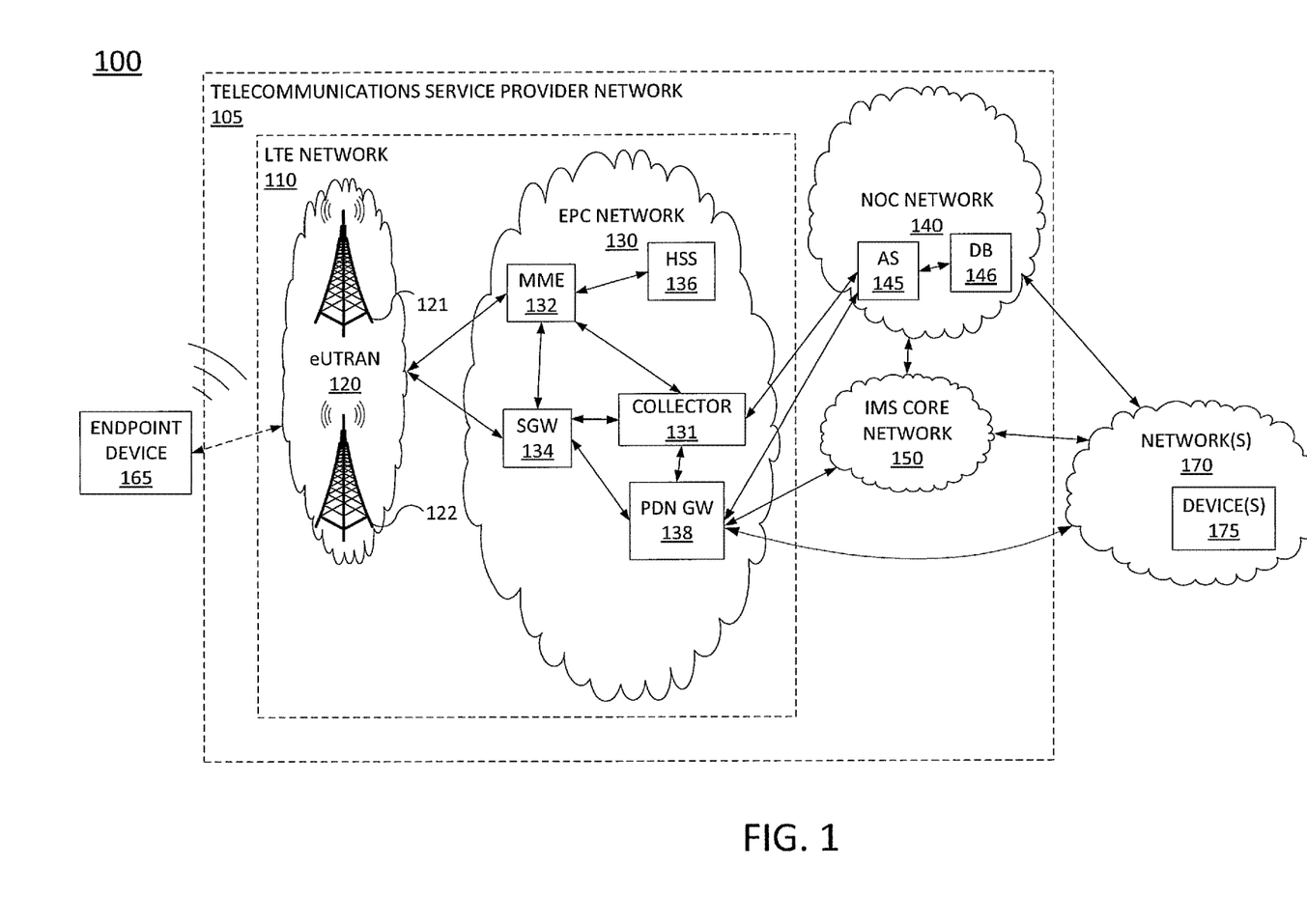
FIG. 1 illustrates an example system related to the present disclosure.

To better understand the present disclosure, FIG. 1 illustrates an example network, or system 100 that may implement embodiments of the present disclosure for storing a compressed version of a message set. In one example, the system 100 includes a telecommunications service provider network 105. The telecommunications service provider network 105 may comprise a Long Term Evolution (LTE) network 110, a network operations center (NOC) network 140, and a core network, e.g., an IP Multimedia Subsystem (IMS) core network 150. The system 100 may further include other networks 170 connected to the telecommunications service provider network 105. As shown in FIG. 1, the system 100 may connect endpoint device 165 with devices 175 in networks 170, with other endpoint devices (not shown) and/or with other components of telecommunication service provider network 105. The endpoint device 165 may comprise a cellular telephone, a smartphone, a tablet computing device, a laptop computer, a pair of computing glasses, a wireless enabled wristwatch, or any other wireless and/or cellular-capable mobile telephony and computing device (broadly, a "mobile endpoint device").

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the 3$^{rd}$ Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeBs 121 and 122 in the eUTRAN 120, are in communication with the EPC network 130. In operation, LTE user equipment or user endpoints (UE), such as endpoint device 165, may access wireless services via the eNodeBs 121 and 122 located in eUTRAN 120. It should be noted that any number of eNodeBs can be deployed in an eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 130 may comprise a Home Subscriber Server (HSS) 136 that contains subscription-related information (e.g., subscriber profiles), performs authentication and authorization of a wireless service user, and provides information about the subscriber's location. The EPC network 130 may also comprise a packet data network (PDN) gateway 138 which serves as a gateway that provides access between the EPC network 130 and various data networks, e.g., NOC network 140, IMS core network 150, networks 170, and the like. The packet data network gateway 138 is also referred to as a PDN gateway, a PDN GW or a PGW.

In one example, NOC network 140 may comprise a network that may be used by personnel of the telecommunications service provider network 105 to perform various tasks relating to the operations, administration, and management (OAM) of the telecommunications service provider network 105. As such, NOC network 140 may represent aspects of telecommunications service provider network 105 where infrastructure for supporting such services may be deployed. In the example of FIG. 1, NOC network 140 may include an application server (AS) 145. In one example, AS 145 may comprise a computing system, such as computing system 500 depicted in FIG. 5, specifically configured to perform various steps, functions, and/or operations for storing a compressed version of a message set, in accordance with the present disclosure. In one example, AS 145 may provide an interface for users to perform searches with respect to compressed/archived message sets, and described in greater detail below. In one example, NOC network 140 may also include a database (DB) 146, e.g., a physical storage device integrated with AS 145 (e.g., a database server), or attached or coupled to the AS 145, to store compressed message sets/archives in accordance with the present disclosure.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. Devices 175 may include personal computers, desktop computers, laptop computers, personal digital assistants (PDAs), tablet computing devices, circuit-switched or packet communications-based telephones, or any other wireless and/or wired communication enabled computing device. In one example, endpoint device 165 may be connected to one of devices 175 via PDN GW 138, and/or via PDN GW 138 and IMS core network 150.

In one example, system 100 may also include a collector 131 in EPC network 130. In one example, collector 131 may comprise a computing system, such as computing system 500 depicted in FIG. 5. For instance, collector 131 may comprise an application server to receive instructions from AS 145, to interact with and configure gateways and/or other network elements components within EPC network 130 in response to such instructions, and/or to perform other operations in accordance with the present disclosure. In one example, collector 131 may interface with various elements within EPC network 130, such as MME 132, SGW 134, HSS 136, PDN GW 138, etc., to collect control plane messages or session plane messages, which may then be compiled and sent to AS 145 for encoding, compression, and/or archiving. The messages may relate to communications traversing EPC network 130 for endpoint devices 165 or for other UEs, internal communications between components within EPC network 130, communications from external devices, such as one of devices 175 to components within EPC network, and so forth. The messages may be grouped into message sets in various ways, such as all messages from a particular network element for a certain time period, blocks of a certain number of messages for a network element, all messages in a given time period for a portion of the EPC network 130, and so forth.

It should be noted that the system 100 has been simplified. In other words, the system 100 may be implemented in a different form than that illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, various elements of eUTRAN 120, EPC network 130, NOC network 140, and IMS core network 150 are omitted for clarity, including gateways or border elements providing connectivity between such networks, internal routers within EPC network 130, and so on. Similarly, due to the relatively large number of connections available between devices in the system 100, various links between MME 132, SGW 134, eNodeBs 111 and 112, controller 131, PDN GW 138, AS 145, and other components of system 100 are also omitted for clarity.

In addition, although aspects of the present disclosure have been discussed above in the context of a long term evolution (LTE)-based network, examples of the present disclosure are not so limited. For example, the teachings of the present disclosure can be applied to other types of wireless networks (e.g., a 2G network, a 3G network, and the like, or a future technology or standard-based network). Similarly, although the AS 145 and DB 146 are illustrated as components of NOC network 140, and collector 131 is illustrated as a component within EPC network 130, in other examples, any one or more of these components may be deployed in a different configuration. For example, collector 131 may reside within NOC network 140 and may communicate with components in EPC network 130 via PDN GW 138, for example. In another example, the AS 145 and collector 131 may be combined into a single component within EPC network 130 or in NOC network 140. In addition, although collector 131 may collect signaling and control plane messages within EPC network 130, in other, further, and different examples, signaling and control plane messages may also be collected from components in eUTRAN 120, e.g., eNodeBs 121 and 122, within IMS core network 150, and so forth. Furthermore, although only a single collector 131, AS 145, and DB 146 are illustrated in FIG. 1, in other, further, and different examples, more examples of any one or more of these components may be deployed within the system 100. For instance, multiple collectors may be deployed within system 100, which may feed message sets to one or more application servers. In addition, the one or more application severs may compress, encode, and archive the message sets, and store the compressed message sets/archives into one or more databases, which may be spread across various physical storage devices in a single location or in multiple different locations, and so on. Thus, these and other modifications are all contemplated within the scope of the present disclosure.

Figure 2:
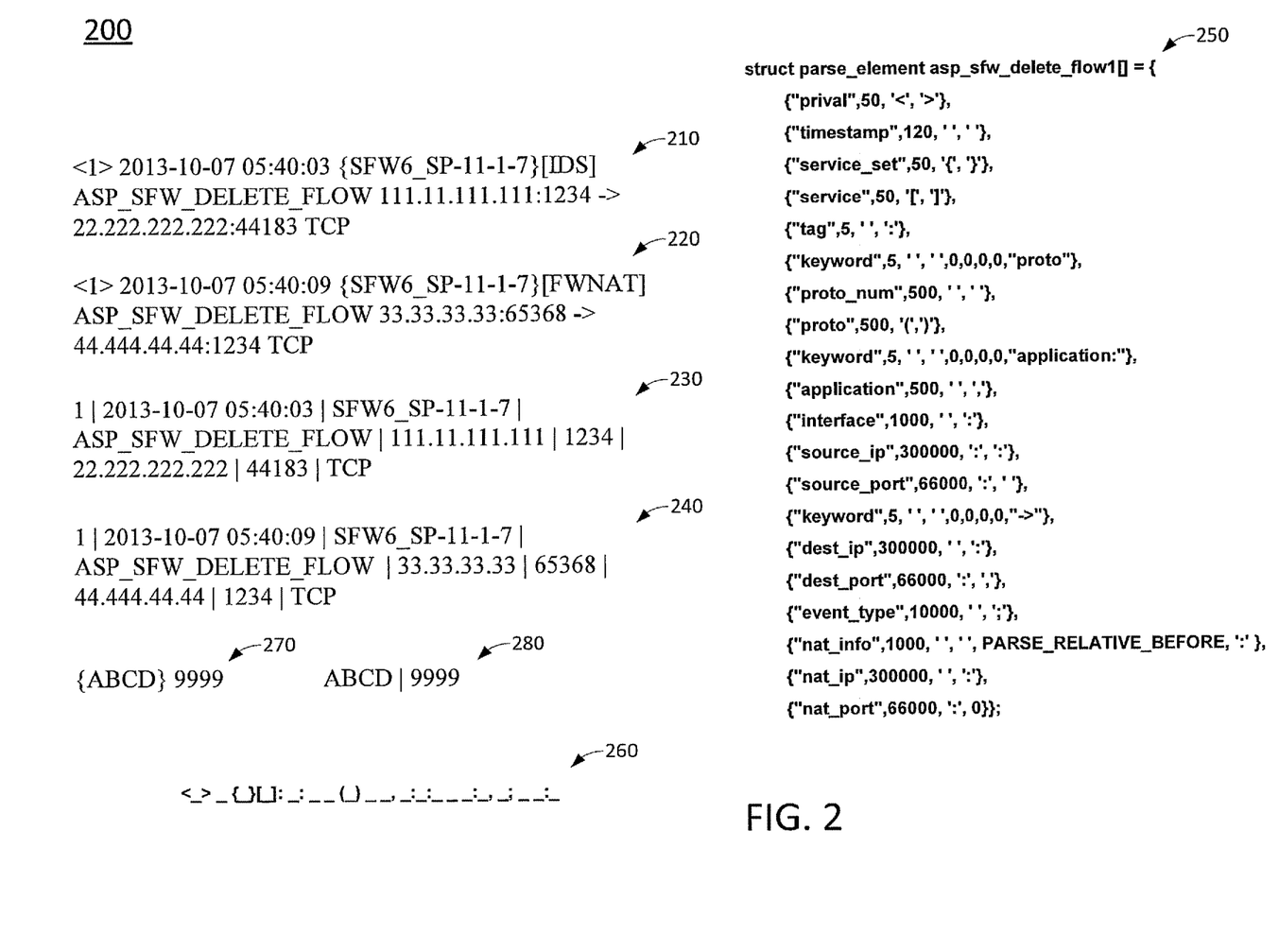
FIG. 2 illustrates an example of parsing messages in a message set, in accordance with the present disclosure.

FIG. 2 illustrates an example 200 of parsing messages in a message set, e.g., messages 210, 220, and 270. In one example, the messages may be received by one or more collectors within a time interval. The goal of message parsing is to identify the message type of each message that is received in the message set and then to break down the message into its component elements once the message type is determined. In one example, the first message 210 and the second message 220 may relate to Internet Protocol version 4 (IPV4) session teardowns, while the third message 270 may relate to different type of event. Messages 210 and 220 each include a number of "elements," or "fields," populated with strings, such as a date and time, e.g., "2013-10-07 05:40:03" or "2013-10-07 05:40:09," a source IP address, e.g., "111.11.111.111" or "33.33.33.33," and so forth. It is noted that the terms "element" and "field" may be used interchangeably herein. In addition, the terms "element type" and "field type" may be used interchangeably.

In one example, the present disclosure includes a parser, which may comprise a device or a component that receives messages in a raw data format, e.g., from one or more collectors, determines a message type of each message, and then extracts the elements from each message according to the message types that are determined. In one example, the parser may comprise application server (AS) 145 in FIG. 1. In one example, the parser may store a number of "parse structures" and parse rules. Each "parse structure" may relate to a different message type and may identify "elements" or fields within messages of the message type and other characteristics, such as a data size range for each field within the message, a range of values that the field may take, static delimiters for various fields, and so forth. An example parse structure 250 for a message type of "asp_sfw_delete_flow" is illustrated in FIG. 2. In parse structure 250, the field types that are expected for messages of this type and the start and end delimiters are declared. For example, "prival" is the name of the first field, and its value can be determined by parsing between the delimiters, "<" and ">." The number 50 is an estimate of how many of these unique "privals" can occur.

Parse rules may consider various features which may be used to distinguish one message type from another, such as the number of fields, the type of information contained in the fields, the types of field delimiters, and intra-field information, such as which fields may follow from one another, which fields may be adjacent to one another, and so forth. For example, a first message type may have a number of occurrences of certain characters that are used as field/element delimiters, such as "{" or "[", while a second message type may not include any such characters, or a different number of such characters. When determining a message type of each message, the parser may utilize a metadata array to store information about which characters appear in the message. In one example, the parser may determine a maximum message length for all messages in a message set so that a size of a metadata array can be assigned. In addition, for all or a portion of the characters of interest, a number of occurrences of the characters and their relative positions in the message may all stored in the metadata array.

The information stored in the metadata array may then be analyzed by the parser against a number of parse rules. For example, with reference to the metadata array, if it is determined that the message does not include a requisite number of special characters that match the first message type, it may be concluded that the message is not of the first message type. Another rule may look to whether or not a special character occurs within a character position, or range of character positions from a start of a message. For instance, the first message type may expect the character of "{" to occur at the $25^{th}$ character position from the start of a message. Thus, if the metadata array is examined and it is determined that the message does not include a "{" in the $25^{th}$ character position, the first message type may be eliminated as a candidate message type. Another rule may look for a sequence of characters "TCP." For example, it may be known that only certain message types relate to transmission control protocol (TCP) communications, while other types of messages may utilize uniform datagram protocol (UDP) communications, or may rely upon a different protocol. As such, a parse rule may narrow the candidate message types to only message types that relate to TCP communications if the string or set of characters "TCP" is found in the message. In other words, all other message types may be eliminated from consideration if this sequence of characters is found in a message. One or more additional parse rules may then be used to determine which message type, from among the remaining candidate message types, is associated with the message. Thus, various parse rules of a similar nature may be deployed within the parser. The parser may execute any one or more of such rules, until the message is uniquely identified as being of a particular message type. For instance, various rules may be utilized in a decision tree algorithm or in a different process to eliminate candidate message types until only one candidate message type remains, or to otherwise uniquely identify the message type of the message. The rules may be arranged in different orders of execution depending upon the types of possible messages that may be encountered within a particular system, the percentages and/or probabilities of encountering messages of various types, the distinguishing features of such messages, and so on.

Once the parser determines the message type of a message, the message may be broken up into strings based upon the fields (or "elements") and the delimiters that occur before and after each field. In one example, a parse structure for the message type is used to determine the boundaries between the different fields within the message. For instance, messages 210 and 220 may be of a first message type. Accordingly, the parse structure 250 may be used to parse both message 210 and message 220 into parsed messages 230 and 240, respectively. Similarly, a different parse structure may be used to parse message 270 into parsed message 280. Thus, the parser may take each message and decompose the message into its elements (e.g., element strings) and calculate the string length(s). The strings and their lengths may be stored into the metadata array or otherwise held for use in creating a compressed version of the message set and/or an archive as described in greater detail below in connection with FIGS. 3-5. For each message type, a string with only the pre-elements for the whole message may also be stored. For example, a pre-element string 260 for messages of the message type "asp_sfw_delete_flow" is shown in FIG. 2 as: "<_>_{_}[_]: _:_ _ (_)_ _,_:_:_ _ _:_, _; _ _:_." The original messages 210 and 220 can be recreated from parsed messages 230 and 240 by substituting underscores of the pre-element string with actual string values for the respective elements.

Figure 3:
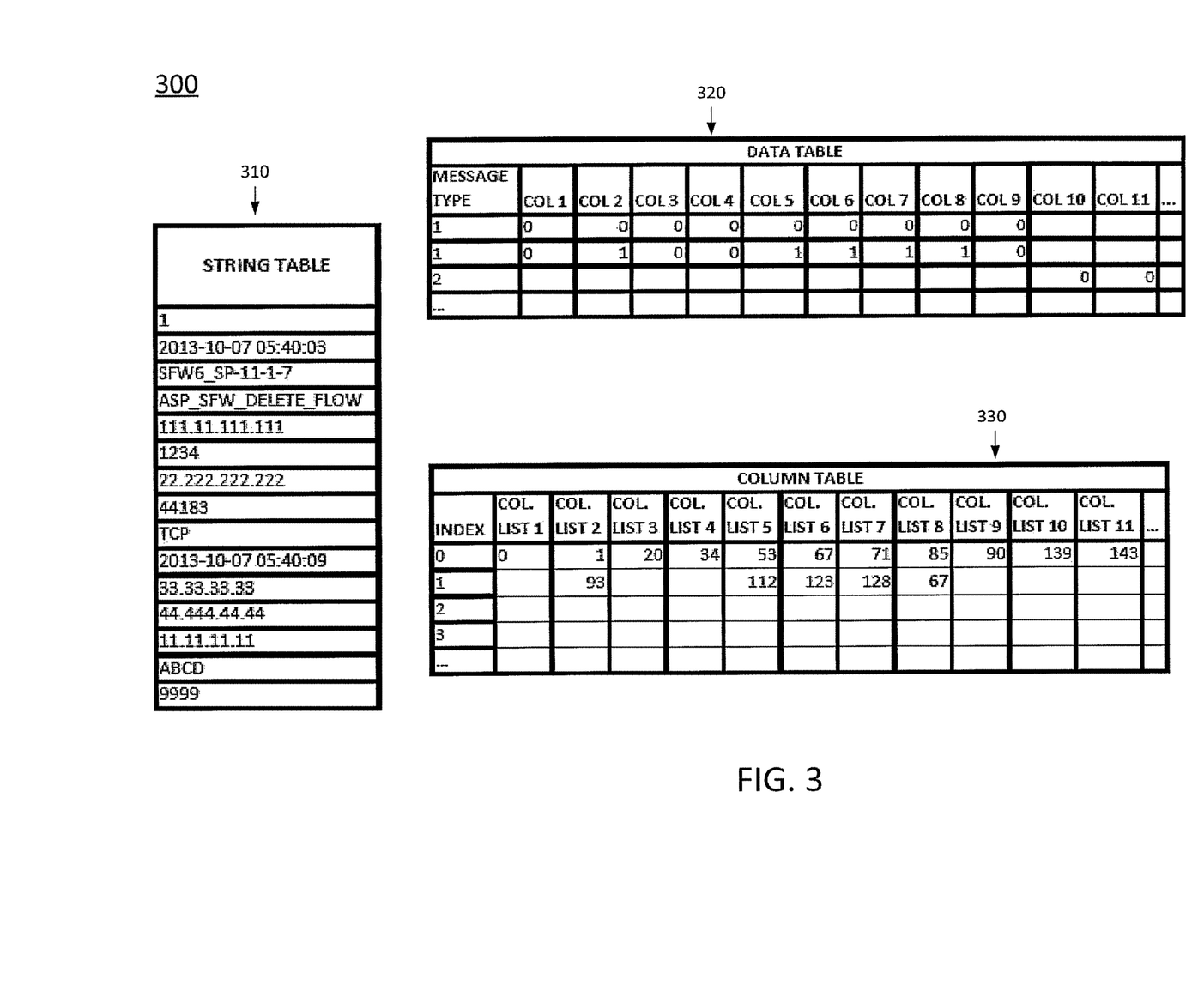
FIG. 3 illustrates example components of a compressed version of a message set that may be created from the message set, in accordance with the present disclosure.

FIG. 3 illustrates components 300 of a compressed version of a message set that may be created from the message set, e.g., in a raw data format. For instance, components 300 may include a string table 310, a data table 320, and a column table 330. In one example, the string table 310 may be populated with strings that are parsed from messages by a parser, e.g., as described above in connection with the example of FIG. 2. For example, strings in the string table 310 may be extracted from parsed messages 230, 240, and 280 in FIG. 2. In one example, the string table 310 is generated by parsing each string in a message set sequentially and inspecting each string in the order in which the string appears in the parsed messages. If the string is not already present in the string table 310, it is added to the string table 310. However, if the string is already present in the string table 310, it is not added to the string table 310. Referring to FIG. 2, it can be seen that parsed messages 230 and 240 both include the strings "SFW6_SP-11-1-7," "ASP_SFW_DELETE_FLOW," and "TCP." It can also be seen in FIG. 2 that all strings from parsed message 230 are added to the string table 310 in the order in which the strings appear in the message 210. However, when traversing parsed message 240, where the repeating elements "SFW6_SP-11-1-7," "ASP_SFW_DELETE_FLOW," and "TCP" are encountered, these are not added a second time to the string table 310. Although string table 310 is illustrated in FIG. 2 as comprising a column of entries, in one example, the string table comprises a single dimensional array or the like in which characters of one string are followed by characters of the next string, and so on.

Data table 320 and column table 330 may be generated as follows. As described above, column table 310 may be created by comparing strings in the parsed messages of the message set to the strings in the string table 310. If the string is not already present in string table 310, the string is added to the string table 310. If the string is already present, it is not added again to the string table 310. However, in either case, an offset position of the string in the string table 310 may be noted. For instance, as mentioned above, string table 310 may comprise a single dimensional array or the like in which characters from one string precede characters from the next string and so on. Thus, the offset position of the string indicates the position within the string table in which the first character of a string appears. In one example, the length of the string may also be noted. For instance, the string "1" is located at an offset position of zero within the string table 310 and has a length of 1. The string of "2013-10-07 05:40:03" is located at an offset position of 1 within the string table 310 and has a length of 19. The string "SFW6_SP-11-1-7" is located at an offset of 20 within the string table 210 and has a length of 14, and so on.

In one example, each field type of each message type that is encountered in a message set may be assigned to a column within data table 320. For instance, for each field type that is encountered for the first time, the field type may be assigned a new column within data table 320. In addition, each column in the data table 320 may be associated with a column list in the column table 330. Thus, in one example, a column list may be appended to column table 330 each time a new field type is encountered. Each of the column lists in column table 330 is for storing a list of offset positions in the string table 310. For instance, Column List 1 includes a single entry with a value of zero. This value references a string that begins at an offset position of zero within the string table 310, e.g., the character/string "1." Column List 2 includes two entries: the first having a value of 1 and the second having a value of 93. An offset position of 1 in the string table corresponds to the beginning position of the string "2013-010-07 05:40:03" while an offset position of 93 corresponds to the beginning position of the string "2013-10-07 05:40:09" within the string table 310. The other column lists may be similarly populated.

Each row in the data table 320 corresponds to a message in the message set. The first column identifies a type of message. For instance, the first two rows may correspond to messages 210 and 220 of FIG. 2, which may be of a same message type, e.g., a first message type, or message type 1. The third row may correspond to message 270 of FIG. 2, which may be of a different message type, e.g., a second message type, or message type 2. When processing a message, if the message includes a string of the field type corresponding to one of the columns in the data table 320 (and hence also corresponding to one of the column lists in column table 330), a value is added to the data table 320 in a position corresponding to the row associated with that message and the column corresponding to that particular field type. The value stored in that (row, column) position in the data table 320 may reference an "index" (e.g., a position within a list) within the column list in column table 330 that is associated with the field type (and also associated with that column in the data table 320). Thus, an entry in the data table 320 can be linked to an index within one of the column lists in column table 330. The offset position/value stored in the column list at that index is linked to a string within the string table 310 that begins at the offset position.

If a string is encountered for the first time with respect to a particular field type, the offset position of the string in the string table 310 may be added as a new entry within the column list of column table 330 that corresponds to that field type (and also corresponds to the column within data table 320 for that field type). For example, the entry may be made in the next index available after the last occupied index within the column list. However, if the string has already be encountered for the field type in a prior message of the same message type, a new entry is not added to the column list corresponding to that field type in the column table 330. For instance, the index in the column list may already have a value of the offset position that points to the location of the string in the string table 310. In either case, an entry in the data table 320 at the (row, column) position for the message and the field type is populated with a value referencing the index where the offset position of the string is located in the corresponding column list in column table 330.

To illustrate, the first row in the data table 320 (after the headers labeled "Col 1," "Col 2," etc.) may correspond to the first message 210 in FIG. 2 (and/or to the first parsed message 230), and the second row may correspond to the second message 220 (and/or the second parsed message 240). Since the first parsed message 230 may be the first message processed for a message set, all of the strings within the first parsed message 230 may have the values of the offset positions of the strings in the string table 310 stored at the first indexes (i.e., index zero) within the respective column lists in column table 330. Therefore, the entire first row of data table 320 includes zeros, referencing the respective first indexes within each of the column lists in column table 330. As the second parsed message 240 is processed, it may be determined that the second parsed message 240 includes a number of strings that were already found in the first parsed message 230. These repeat strings are not added to the string table 310. In addition, no new offset position values are added to the respective column lists in column table 330 corresponding to the field types within the second message 220/second parsed message 240 where such strings are found. Therefore, in the second row of data table 320, it can be seen that some of the entries include index values of zero, and some of the entries include index values of 1. Any of the entries that are a zero in the second row of the data table 320 point to the same index within a corresponding column list of column table 330 as an entry within the first row and within the same column in data table 320. It should be noted that some strings may appear in different fields in different messages. Thus, an offset position for such a string may be populated into more than one column list in the column table 330. For instance, the string "1234" appears in the sixth field in message 210 and in the eighth field of message 220. The offset position of string 1234 in string table 310 is 67. As such, the offset position of 67 appears in both Column List 6 and in Column List 8 in column table 330.

Subsequent messages in a message set may be processed in the same or in a similar manner. For instance, any newly encountered strings may be added to the string table 310. Whether the string is new or not, the offset position of the string in the string table 310 may be noted. If the string is encountered in a new field type (one that has not been seen before within any messages of the message set that have already been processed) a new column in the data table 320 and a new column list in the column table 330 may be created. The offset position of the string may be added to the index zero position in the new column list, and the index (i.e., the value of zero) may be added to the (row, column) position in the data table 320. If the string does not relate to a new field type, the column list for that field type may then be traversed to determine if an entry in the column list already includes a value of that offset position. If there is already an entry present with the value of the offset position, the index (i.e., the position within the column list) of that entry is noted and is populated into the (row, column) location within data table 320 corresponding to the message and the field type. If there is not already an entry having the value of the offset position present in the column list, the offset position of the string is added as a new entry in the column list and the index where the new entry is added to the column list is populated into the (row, column) location within data table 320 corresponding to the message and the field type.

To further illustrate, the third row in data table 320 may relate to message 270 of FIG. 2. Since message 270 is of a second message type, it may include different fields as compared to messages 210 and 220 of the first message type. In addition, since message 270 includes two fields, two additional columns (columns 10 and 11) may be created in data table 320 and two additional column lists (Column 10 List and Column 11 List) may be created in column table 330 during the processing of parsed message 280 that is derived from message 270.

As mentioned above, as each string in each message of a message set is processed, the string table 310, data table 320, and column table 330 may be created, expanded, and populated with strings, offset positions, indexes, and so on. Once the messages in the message set are processed in this way, the string table 310, data table 320, and column table 330 may be stored as a compressed version of the message set, e.g., in a physical memory or memories of one or more computing devices, in one or more storage devices, etc. The original message set may be recreated from the compressed version of the message set by accessing the compressed version of the message set and traversing the data table 320 row by row, and column by column within each row. For example, at each (row, column) location within data table 320, the value of an index is recorded. The index may be used as a lookup to retrieve an offset position that is recorded within a column list in column table 330 that is associated with the column (and the field type associated with the column and the column list). A string may then be extracted from string table 310 at the offset position. One or more strings may be retrieved for a row of data table 320 in this way. In addition, as mentioned above, for each message type, a string with only the pre-elements for the whole message may also be stored. This may be stored as part of the compressed version of the message set or may be stored separately. For instance, the pre-element string may be relevant to a number of message sets which may include messages of a same message type. As such, the pre-element string may be stored separately from the compressed versions of the various message sets, rather than storing different copies of the same pre-element string with the respective message sets. In any event, the data table may include an entry for each row that indicates the message type of the message associated with the row. Accordingly, the pre-element string for the message type of the message associated with the row may be retrieved and the strings that are extracted from the string table 310 may be populated into the respective fields to recreate the original message. Additional rows of the data table 320 may also be processed in the same or a similar manner to recreate the original version of the message set, e.g., in a raw data format.

It should be noted that variations of the above process may also be implemented in accordance with the present disclosure. For example, the above disclosure describes that when processing each message in a message set, a string of the message is first searched against strings that may already be present in string file 310. However, in another example, a column list for the field associated with the string may first be traversed. The value of each entry that is stored in the column list (each of which identifies a respective offset position in the string table 310) may be referenced to determine if it points to a matching string in the string table 310. If so, the index of the matching entry (i.e., the position which the matching entry occupies within the column list) may be returned and written to the (row, column) location in the data table 320 that corresponds to the message and the field type. Otherwise, the string may be added to the string table 310, the offset position of the string within the string table 310 may be written as a new entry within the column list for that field type, and the index of the new entry in the column list may be be written to the (row, column) location in the data table 320 that corresponds to the message and the field type.

In another example, a column list may store both an offset position as well as a length of the string found at the offset position. In this way, the start and end of each string in the string table 310 may be delimited when the offset position is retrieved from a column list in the column table. In still another example, different column tables may be used for different message types. In other words, each message type may have a separate column table with different column lists associated with the field types of the different message types. Thus, additional changes of a same or a similar nature may be implemented in the processing of messages in a message set into an archive, and the decompressing/extracting of messages or the message set from the archive, in accordance with the present disclosure.

Figure 4:
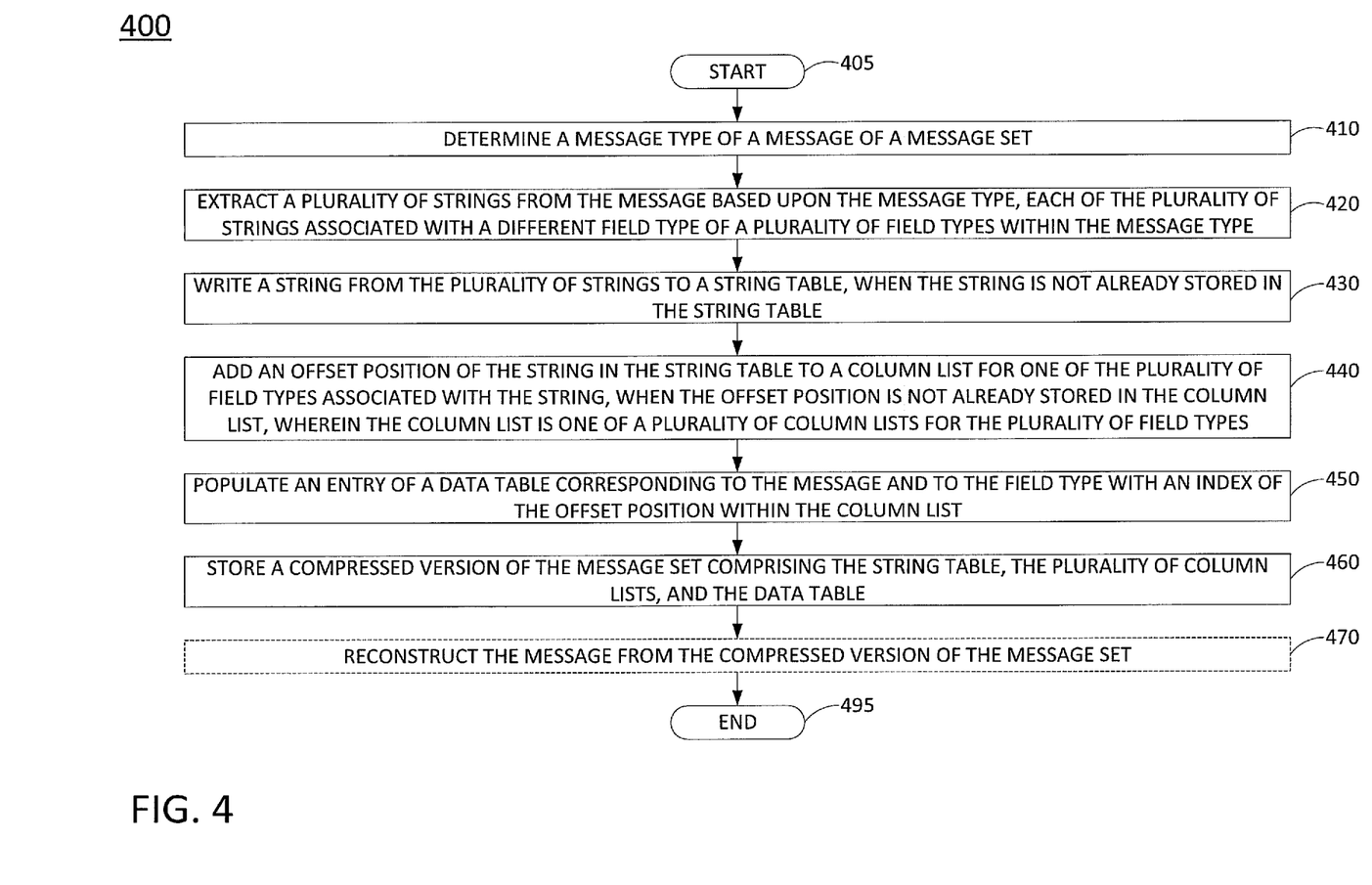
FIG. 4 illustrates a flowchart of an example method for storing a compressed version of a message set.

FIG. 4 illustrates a flowchart of an example method 400 for storing a compressed version of a message set, in accordance with the present disclosure. In one example, steps, functions and/or operations of the method 400 may be performed by a network-based device, such as application server (AS) 145 or the AS 145 in conjunction with other components of the system 100, such as collector 131. In one example, the steps, functions, or operations of method 400 may be performed by a computing device or system 500, and/or processor 502 as described in connection with FIG. 5 below. For instance, computing device or system 500 may represent an application server, or an application server integrated with a collector of the present disclosure. For illustrative purposes, the method 400 is described in greater detail below in connection with an example performed by a processor, such as processor 502. The method 400 begins in step 405 and proceeds to step 410.

At step 410, the processor determines a message type of a message in a message set. In one example, the message type may be determined using one or more parse structures and/or one or more parse rules, as described above. For instance, the processor may examine characters within the message to determine a number of occurrences of special characters, such as "{," "[," ":," and so forth, the relative positions between special characters, the occurrence of a string or sequence of characters, e.g., "TCP" versus "UDP," and so on. In another example, a collector from which the message and/or the message set is received may be used to determine the message type. For instance, a collector may be configured to only forward certain types of messages for processing by the processor. As such, a parse rule may rule out possible message types that are not part of the forwarding configuration of the collector.

At step 420, the processor extracts a plurality of strings from the message based upon the message type that is determined. In one example, each of the plurality of strings is associated with a different field type of a plurality of field types within the message type. For example, the message may be broken up into strings based upon the fields, or "elements," and the delimiters that occur before and after each field. In one example, a parse structure for the message type may be used to determine the boundaries between the different fields within the message. In one example, the lengths of the strings may also be determined. As such, the strings, or the strings and their lengths, may then be stored or held for use in creating a compressed version of the message set.

At step 430, the processor writes a string from the plurality of strings to a string table, when the string is not already present in the string table. For example, the string table may be generated by parsing each message in a message set sequentially and inspecting each string in the order in which the string appears in the parsed messages. In one example, the string table may comprise a single dimensional array or the like in which characters from one string precede characters from the next string and so on. If the string is not already present in the string table, it is added to the string table. However, if the string is already present in the string table, it is not added to the string table.

At step 440, the processor adds an offset position of the string in the string table to a column list for one of the plurality of field types associated with the string, when the offset position is not already stored in the column list. The offset position of the string indicates the position within the string table in which the first character of a string appears. In one example, the column list is one of a plurality of column lists for the plurality of field types. For instance, the column lists may be stored in a column table comprises the plurality of column lists. If the string is encountered for the first time with respect to a particular field type, the offset position of the string in the string table may be added as a new entry within the column list that corresponds to that field type (and which also corresponds to a column for that field type within data table). For example, the entry may be made in the next index available after the last occupied index within the column list. However, if the string has already been encountered for the field type in a prior message of the message set having the same message type, a new entry is not added to the column list corresponding to that field type. For instance, an index in the column list may already have a value of the offset position that points to the location of the string in the string table. In addition, in one example, if the field type is encountered for the first time with respect to the message set when processing the message according to step

420, step 440 may further include creating the column list for the field type before adding the offset position to the column list.

At step 450, the processor populates an entry of a data table corresponding to the message and to the field type with an index of the offset position within the column list. In one example, each field type of each message type of the messages that are encountered in a message set may be assigned to a column within the data table. For instance, for each field type that is encountered for the first time, the field type may be assigned a new column within data table. In one example, each row in the data table corresponds to a message in the message set. In one example, each row also identifies a type of message that is associated with the row. For example, a first column of each row may identify a message type of the message represented by the row. In one example, the entry that is populated with the index is located in a position corresponding to the row associated with that message and the column corresponding to that particular field type. Thus, the entry in the data table can be linked to an index within the one of the plurality of column lists associated with the field type. The offset position/value stored in the column list at that index is linked to the string within the string table, which can be found at the offset position.

At step 460, the processor stores a compressed version of the message set comprising the string table, the plurality of column lists, and the data table. For instance, as described above, an original message and/or an original message set may be reconstructed from the string table, the plurality of column lists, and the data table. As such, the string table, the plurality of column lists, and the data table may be considered a compressed version of the message set which can be stored for later access and/or any number of purposes. The storing at step 460 may comprise placing the compressed version of the message set in in a physical memory or memories of one or more computing devices, in one or more storage devices, etc. In one example, the compressed version of the message set may utilize less resources, e.g., less memory or less storage volume, than the set of messages in a raw data format. Following step 460, the method 400 may proceed to optional step 470 or to step 495.

At optional step 470, the processor may reconstruct the message from the compressed version of the message set. For example, an original message set may be recreated from the compressed version of the message set by accessing the compressed version of the message set and traversing the data table row by row, and column by column within each row. For instance, at each (row, column) location within data table, the value of an index is recorded. The index may be used as a lookup to retrieve an offset position that is recorded within the one of the plurality of column lists that is associated with the column (and the field type associated with the column and the column list). A string may then be extracted from string table at the offset position. One or more strings may be retrieved for a row of data table in this way.

In addition, as mentioned above, for each message type, a string with only the pre-elements for the whole message may also be stored. This may be stored as part of the compressed version of the message set or may be stored separately. As also mentioned above, in one example the data table may include an entry for each row that indicates the message type of the message associated with the row. Accordingly, the pre-element string for the message type of the message associated with the row may be retrieved and the strings that are extracted from the string table may be populated into the respective fields to recreate the original message. Additional rows of the data table may also be processed in the same or a similar manner to recreate the original version of the message set, e.g., in a raw data format. As such, in one example, the reconstructing the message from the compressed version of the message set at optional step 470 comprises: identifying the message type of the message from the row associated with the message in the data table, wherein the row includes an identifier of the message type, extracting indexes from the row associated with the message, extracting offset positions from the plurality of column lists based upon the indexes, and retrieving strings from the string table that are associated with the offset positions. In addition, in one example, the reconstructing the message from the compressed version of the message set at optional step 470 may further comprise: obtaining a pre-element string for the message type, and assembling the message from the strings that are retrieved and the pre-element string.

Following optional step 470, the method 400 proceeds to step 495. At step 495, the method 400 ends.

In addition, it should be noted that although not specifically specified, one or more steps, functions or operations of the method 400 may include a storing, displaying and/or outputting step as required for a particular application. In other words, any data, records, fields, and/or intermediate results discussed in the method 400 can be stored, displayed and/or outputted to another device as required for a particular application. Furthermore, steps or blocks in FIG. 4 that recite a determining operation or involve a decision do not necessarily require that both branches of the determining operation be practiced. In other words, one of the branches of the determining operation can be deemed as an optional step. It should be noted that the method 400 may be expanded to include additional steps. In addition, one or more steps, blocks, functions, or operations of the above described method 400 may comprise optional steps, or can be combined, separated, and/or performed in a different order from that described above, without departing from the example embodiments of the present disclosure.

As such, the present disclosure provides at least one advancement in the technical field of telecommunications network messaging operations and storage system management. For instance, examples of the present disclosure include devices that increase the storage efficiency associated with message sets to be stored. In particular, examples of the present disclosure collect messages, categorize the messages, compress the messages in a message set, and store a compressed version of a message set in a more efficient manner. For instance, the compressed version of the message set may utilize less resources, e.g., less memory or less storage volume, than the set of messages in a raw data format. In addition, examples of the present disclosure improve the functioning of a computing device, e.g., a server. Namely, servers dedicated to storing message sets are improved in the examples of the present disclosure, such as the application server (AS) described herein, which manages and implement the creating and the storing of a compressed version of a message set.

Figure 5:
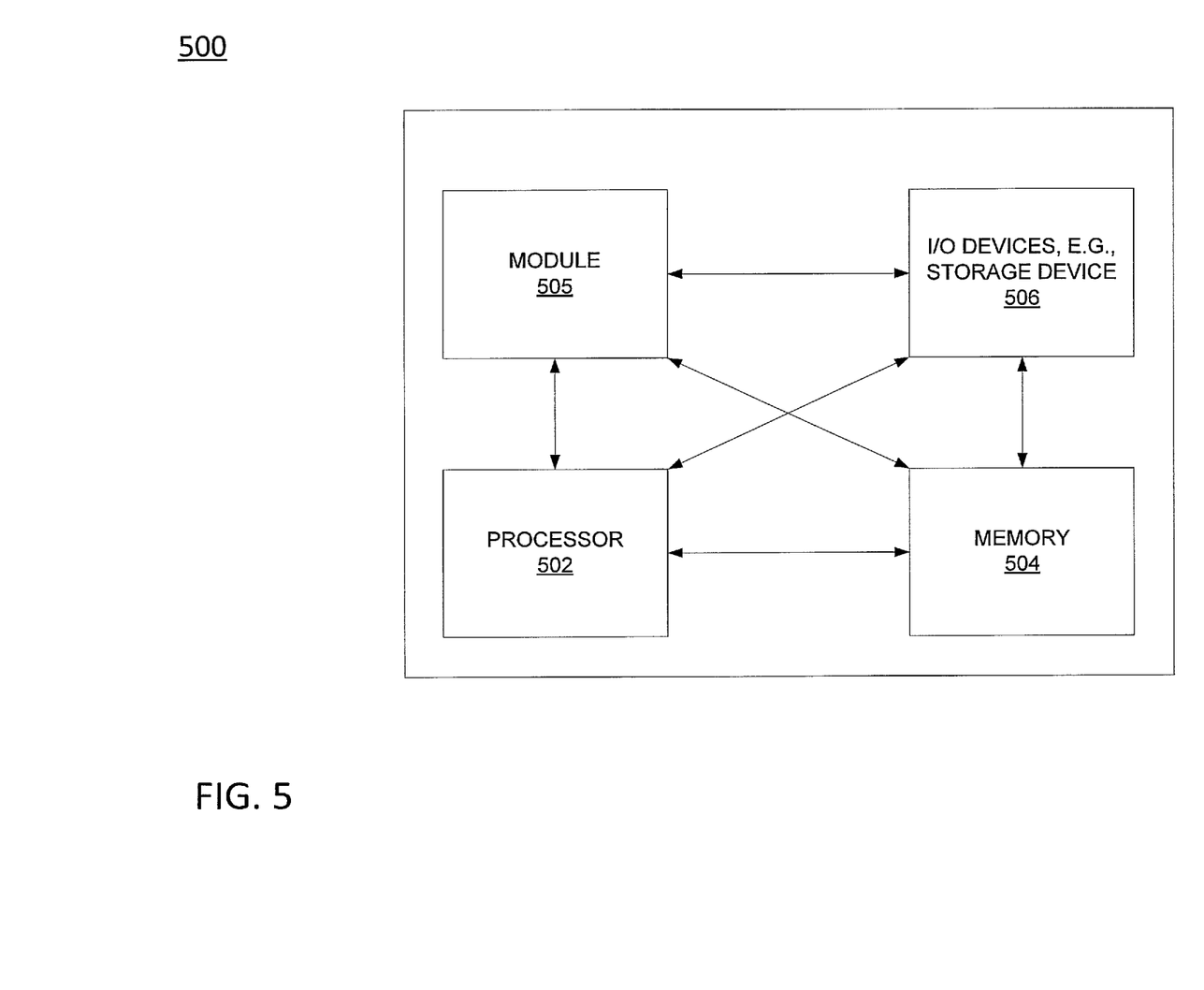
FIG. 5 illustrates an example high-level block diagram of a computer specifically programmed to perform the steps, functions, blocks, and/or operations described herein.

FIG. 5 depicts a high-level block diagram of a computing device suitable for use in performing the functions described herein. As depicted in FIG. 5, the system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for storing a compressed version of a message set, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 400 as discussed above is implemented in a distributed or parallel manner for a particular illustrative example, i.e., the steps of the above method 400, or the entire method 400 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 400. In one embodiment, instructions and data for the present module or process 505 for storing a compressed version of a message set (e.g., a software program comprising computer-executable instructions) can be loaded into memory 504 and executed by hardware processor element 502 to implement the steps, functions or operations as discussed above in connection with the illustrative method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for storing a compressed version of a message set (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
    a processor; and
    a computer-readable medium storing instructions which, when executed by the processor, cause the processor to perform operations, the operations comprising:
        determining a message type of a message of a plurality of messages of a message set;
        extracting a plurality of strings from the message based upon the message type, each of the plurality of strings associated with a different field type of a plurality of field types within the message type;
        writing a string from the plurality of strings to a string table, when the string is not already stored in the string table;
        adding an offset position of the string in the string table to a column list for one field type of the plurality of field types associated with the string, when the offset position is not already stored in the column list, wherein the column list is one of a plurality of column lists for the plurality of field types;
        populating an entry of a data table corresponding to the message and to the one field type with an index of the offset position within the column list, wherein rows of the data table are associated with different messages of the message set, wherein columns of the data table are associated with different field types of the plurality of field types, and wherein the entry of the data table corresponding to the message and to the one field type is an entry within a row associated with the message and within a column associated with the one field type of the plurality of field types associated with the string; and
        storing a compressed version of the message set comprising the string table, the plurality of column lists, and the data table.

2. The device of claim 1, wherein the string table is populated with strings extracted from the plurality of messages of the message set.

3. The device of claim 1, wherein the index identifies a location of the offset position within the column list.

4. The device of claim 3, wherein the message type is determined using a parse element that identifies characteristics of the plurality of field types within the message type.

5. The device of claim 1, wherein the rows of the data table further identify message types of the different messages of the message set associated with the rows.

6. The device of claim 1, wherein the operations further comprise:
    reconstructing the message from the compressed version of the message set.

7. The device of claim 6, wherein the reconstructing the message from the compressed version of the message set comprises:
    identifying the message type of the message from a row associated with the message in the data table, wherein the row includes an identifier of the message type;
    extracting indexes from the row associated with the message;
    extracting offset positions from the plurality of column lists based upon the indexes; and retrieving strings from the string table that are associated with the offset positions.

8. The device of claim 7, wherein the reconstructing the message from the compressed version of the message set further comprises:
obtaining a pre-element string for the message type; and
assembling the message from the strings that are retrieved and the pre-element string.

9. A non-transitory computer-readable medium storing instructions which, when executed by a processor in a network, cause the processor to perform operations, the operations comprising:
determining a message type of a message of a plurality of messages of a message set;
extracting a plurality of strings from the message based upon the message type, each of the plurality of strings associated with a different field type of a plurality of field types within the message type;
writing a string from the plurality of strings to a string table, when the string is not already stored in the string table;
adding an offset position of the string in the string table to a column list for one field type of the plurality of field types associated with the string, when the offset position is not already stored in the column list, wherein the column list is one of a plurality of column lists for the plurality of field types;
populating an entry of a data table corresponding to the message and to the one field type with an index of the offset position within the column list, wherein rows of the data table are associated with different messages of the message set, wherein columns of the data table are associated with different field types of the plurality of field types, and wherein the entry of the data table corresponding to the message and to the one field type is an entry within a row associated with the message and within a column associated with the one field type of the plurality of field types associated with the string; and
storing a compressed version of the message set comprising the string table, the plurality of column lists, and the data table.

10. The non-transitory computer-readable medium of claim 9, wherein the string table is populated with strings extracted from the plurality of messages of the message set.

11. The non-transitory computer-readable medium of claim 9, wherein the index identifies a location of the offset position within the column list.

12. The non-transitory computer-readable medium of claim 11, wherein the message type is determined using a parse element that identifies characteristics of the plurality of field types within the message type.

13. The non-transitory computer-readable medium of claim 9, wherein the rows of the data table further identify message types of the different messages of the message set associated with the rows.

14. The non-transitory computer-readable medium of claim 9, wherein the operations further comprise:
reconstructing the message from the compressed version of the message set.

15. The non-transitory computer-readable medium of claim 14, wherein the reconstructing the message from the compressed version of the message set comprises:
identifying the message type of the message from a row associated with the message in the data table, wherein the row includes an identifier of the message type;
extracting indexes from the row associated with the message;
extracting offset positions from the plurality of column lists based upon the indexes; and
retrieving strings from the string table that are associated with the offset positions.

16. The non-transitory computer-readable medium of claim 15, wherein the reconstructing the message from the compressed version of the message set further comprises:
obtaining a pre-element string for the message type; and
assembling the message from the strings that are retrieved and the pre-element string.

17. A method comprising:
determining, by a processor, a message type of a message of a plurality of messages of a message set;
extracting, by the processor, a plurality of strings from the message based upon the message type, each of the plurality of strings associated with a different field type of a plurality of field types within the message type;
writing, by the processor, a string from the plurality of strings to a string table, when the string is not already stored in the string table;
adding, by the processor, an offset position of the string in the string table to a column list for one field type of the plurality of field types associated with the string, when the offset position is not already stored in the column list, wherein the column list is one of a plurality of column lists for the plurality of field types;
populating, by the processor, an entry of a data table corresponding to the message and to the one field type with an index of the offset position within the column list, wherein rows of the data table are associated with different messages of the message set, wherein columns of the data table are associated with different field types of the plurality of field types, and wherein the entry of the data table corresponding to the message and to the one field type is an entry within a row associated with the message and within a column associated with the one field type of the plurality of field types associated with the string; and
storing, by the processor, a compressed version of the message set comprising the string table, the plurality of column lists, and the data table.

18. The method of claim 17, further comprising:
reconstructing the message from the compressed version of the message set.

19. The method of claim 18, wherein the reconstructing the message from the compressed version of the message set comprises:
identifying the message type of the message from a row associated with the message in the data table, wherein the row includes an identifier of the message type;
extracting indexes from the row associated with the message;
extracting offset positions from the plurality of column lists based upon the indexes; and
retrieving strings from the string table that are associated with the offset positions.

20. The method of claim 17, wherein the rows of the data table further identify message types of the different messages of the message set associated with the rows.

* * * * *